(12) United States Patent
Stephen et al.

(10) Patent No.: US 7,896,599 B2
(45) Date of Patent: Mar. 1, 2011

(54) HYBRID COMPOSITE-METAL MALE FASTENER

(76) Inventors: Douglas Stephen, Pomona, CA (US); Robert Stephen, Pomona, CA (US)

( * ) Notice: Subject to any disclaimer, the term of this patent is extended or adjusted under 35 U.S.C. 154(b) by 0 days.

(21) Appl. No.: 12/229,460

(22) Filed: Aug. 21, 2008

(65) Prior Publication Data

US 2010/0047034 A1  Feb. 25, 2010

(51) Int. Cl.
*A47G 3/00* (2006.01)

(52) U.S. Cl. ............ 411/377; 411/901; 411/424; 470/14

(58) Field of Classification Search ............... 411/377, 411/383, 424, 901, 372.6, 908, 914, 395, 411/904; 470/14
See application file for complete search history.

(56) References Cited

U.S. PATENT DOCUMENTS

| | | | |
|---|---|---|---|
| 4,452,556 A * | 6/1984 | Nelson et al. ............. | 411/377 |
| 4,718,801 A * | 1/1988 | Berecz ..................... | 411/378 |
| 4,824,314 A * | 4/1989 | Stencel .................... | 411/378 |
| 4,887,951 A * | 12/1989 | Hashimoto ............... | 411/371.1 |
| 4,945,625 A | 8/1990 | Winston ................... | 29/524.1 |
| 4,948,318 A * | 8/1990 | Nottelmann et al. ........ | 411/377 |
| 4,948,319 A * | 8/1990 | Day et al. ................ | 411/377 |
| 5,090,857 A | 2/1992 | Dunn ...................... | 411/385 |
| 5,092,550 A * | 3/1992 | Bettini .................... | 248/188.4 |
| 5,122,021 A | 6/1992 | Medal ..................... | 411/377 |
| 5,292,215 A * | 3/1994 | Roberts, III .............. | 411/424 |
| 5,356,254 A | 10/1994 | DiMaio et al. ............ | 411/302 |
| 5,499,942 A | 3/1996 | Pflager .................... | 451/14 |
| 5,533,247 A | 7/1996 | Ishii et al. ................ | 29/527.4 |
| 5,827,287 A | 10/1998 | Tunc ...................... | 606/76 |
| 5,876,288 A | 3/1999 | Jaskowiak ............... | 464/181 |
| 6,296,573 B1 | 10/2001 | Duffy et al. .............. | 470/18 |
| 6,454,504 B2 | 9/2002 | Duffy et al. .............. | 411/304 |
| 6,588,999 B2 | 7/2003 | Kubler et al. ............. | 411/82.1 |
| 6,880,787 B2 | 4/2005 | Stephen et al. ............ | 248/68.1 |
| 6,880,788 B2 | 4/2005 | Stephen ................... | 248/68.1 |
| 6,908,275 B2 | 6/2005 | Nelson et al. ............. | 411/487 |
| 7,156,598 B2 * | 1/2007 | Tibbenham et al. ........ | 411/82 |
| 7,195,436 B1 | 3/2007 | Stephen ................... | 411/82.1 |
| 7,208,013 B1 | 4/2007 | Bonutti ................... | 623/11.11 |
| 7,427,181 B2 * | 9/2008 | Denton et al. ............. | 411/383 |

FOREIGN PATENT DOCUMENTS

| | | | |
|---|---|---|---|
| JP | 59135137 A | 8/1984 | |
| JP | 08108484 A | 4/1996 | |

* cited by examiner

*Primary Examiner* — Gary Estremsky
(74) *Attorney, Agent, or Firm* — Russo & Duckworth, LLP; David G. Duckworth

(57) ABSTRACT

A composite metal male fastener is provided. The metal fastener includes an elongate hollow shell made of metal. The shell includes a threaded exterior for insertion or retraction from the threads of a female fastener. In addition, the shell element includes a central bore and a radially extending flange. The male fastener further includes a core element made of a composite material including plastic, fiberglass or carbon fiber or the like. The core element fills the shell's central bore and extends from the shell to encapsulate the shell's flange to form a male fastener head.

7 Claims, 3 Drawing Sheets

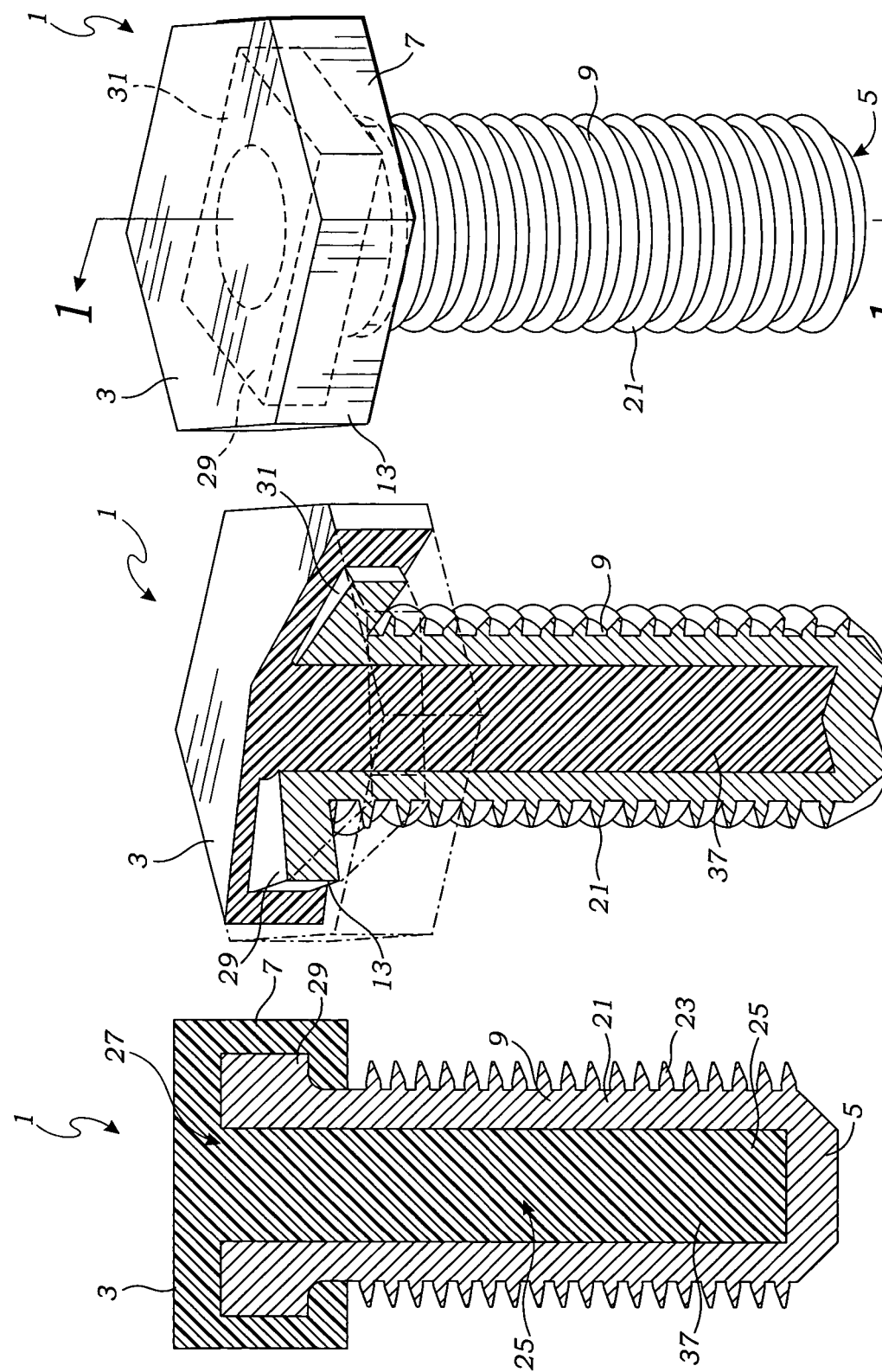

HYBRID COMPOSITE-METAL MALE FASTENER

BACKGROUND OF THE INVENTION

The present invention relates to fasteners. More specifically, the present invention relates to lightweight male fasteners particularly applicable for use in aircraft construction. Male fasteners made all of metal have extremely high strength. However, metal fasteners are excessively heavy. Where weight is a premium, such as within aircraft construction, all metal fasteners pose significant problems. For fastening together portions of certain high stressed constructions, such as aircraft and other assemblies requiring high strength and light weight, many variations of the traditional male fastener have been developed. Most of these prior art male fasteners have been made by using different materials in an effort to reduce weight. Unfortunately, the reduction in weight has caused a corresponding reduction in strength and/or the ability to withstand the various stresses to which the assembly may be subjected.

Various attempts have been made to overcome the disadvantages of prior art male fasteners. Unfortunately, the various attempted constructions suffer from disadvantages of their own. Previous attempts have typically included providing a plastic molded core which is then coated with metal. The head of the male fastener is typically also metal and formed to engage the exterior coating. Though these male fasteners with a plastic interior save weight, they are still very heavy.

U.S. Pat. No. 4,824,314 illustrates a lightweight threaded male fastener which includes a metal shell made of steel or titanium. The shell is then filled with a non-metallic compound such as an epoxy or graphite. Similarly, U.S. Pat. No. 5,292,215 illustrates a bolt having a metal shell in which the bolt head, shank and threads are all metal. However, the bolt has a central cavity filled with axially and spirally aligned composite fibers. Though saving weight, it would be desirable to provide a threaded male fastener which provides even additional weight savings.

Alternative attempts have been made to provide a high strength lightweight male fastener. For example, instead of providing a metal shell and composite core, it has been proposed to reverse the materials. For example, U.S. Pat. No. 6,296,573 describes a method of making a metal and plastic fastener in which the fastener core is metal. However, the core is then coated with a thermoplastic material. Similarly, U.S. Pat. No. 5,356,254 describes a metal male fastener encapsulated in plastic. Unfortunately, these constructions do not provide particularly high strengths and are heavier than desired.

Thus, it would be advantageous to provide an improved male fastener which possesses high strength.

It would also be advantageous to provide an improved male fastener which was lightweight, inexpensive to manufacture, and particularly acceptable for use within aircraft construction.

SUMMARY OF THE INVENTION

The present invention addresses the aforementioned disadvantages by providing an improved male fastener comprised of both metal and a composite material such as plastic. The combination of metal and plastic provides optimal high strength properties suitable for use in high stress applications. In addition, the light weight enables the male fastener to be optimal for aircraft construction.

The composite-metal male fastener includes an elongate hollow shell which is made of metal. The shell element includes a proximal extremity corresponding to the end of a male fastener typically having a head. The shell further includes a distal extremity which is threaded and defines the tip for projecting into a female fastener. The shell includes an axially aligned central bore which extends substantially the length of the entire shell. The bore further extends to the shell's proximal extremity to form an opening. Adjacent the opening, the proximal end of the shell includes a flange which extends radially from the shell's opening.

The composite-metal male fastener further includes a core element. The core element is made of plastic and fills the shell's central bore. Furthermore, the core element extends proximally and radially outward from the shell's central bore through the shell's opening to encapsulate the shell's flange to form a male fastener head. The male fastener head may take various forms as can be selected by those skilled in the art. For example, in a preferred embodiment the male fastener head has a hexagonal shape for being rotated by wrenches and/or socket tools. In additional embodiments, the male fastener head is constructed to be polygonal of different shapes such as three sided, four sided or five sided. The male fastener head may also be circular and include a recess sized for receipt of a tool such as a slot for receipt of a screwdriver, a hexagonal recess for receiving an Allen wrench, or a multi-sided star shaped recess for receipt of a star-driver as is more common in European constructions. Still additional constructions for the male head may be selected without departing from the spirit and scope of the invention.

An advantage of the present invention is that the male fastener has particularly high strength due to the use of metal forming the male fastener's shell as well as the male fastener threads.

An additional advantage of the present invention is that the male fastener is exceptionally lightweight as a result of employing a composite material for its core.

These and other objects and advantages of the invention will be apparent to those skilled in the art from the following detailed description taken in conjunction with drawings.

BRIEF DESCRIPTION OF THE DRAWINGS

FIG. 1 is a side cutaway of the composite metal male fastener illustrated in FIG. 2;

FIG. 2 is a perspective cutaway view of an embodiment of the composite metal male fastener of the present invention;

FIG. 3 is a perspective view of an embodiment of the composite metal male fastener of the present invention with hexagonal head and interior rectangular flange;

DETAILED DESCRIPTION OF THE INVENTION

Figure 4:
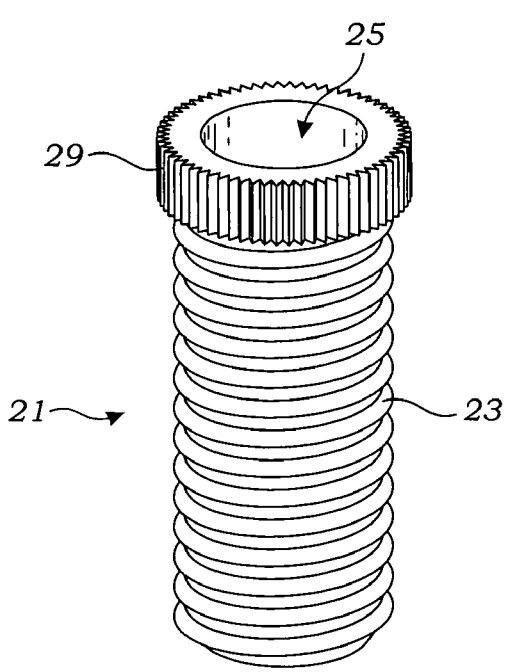
FIG. 4 is a perspective view of an embodiment of an elongate hollow shell for use with the composite metal male fastener of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 8:
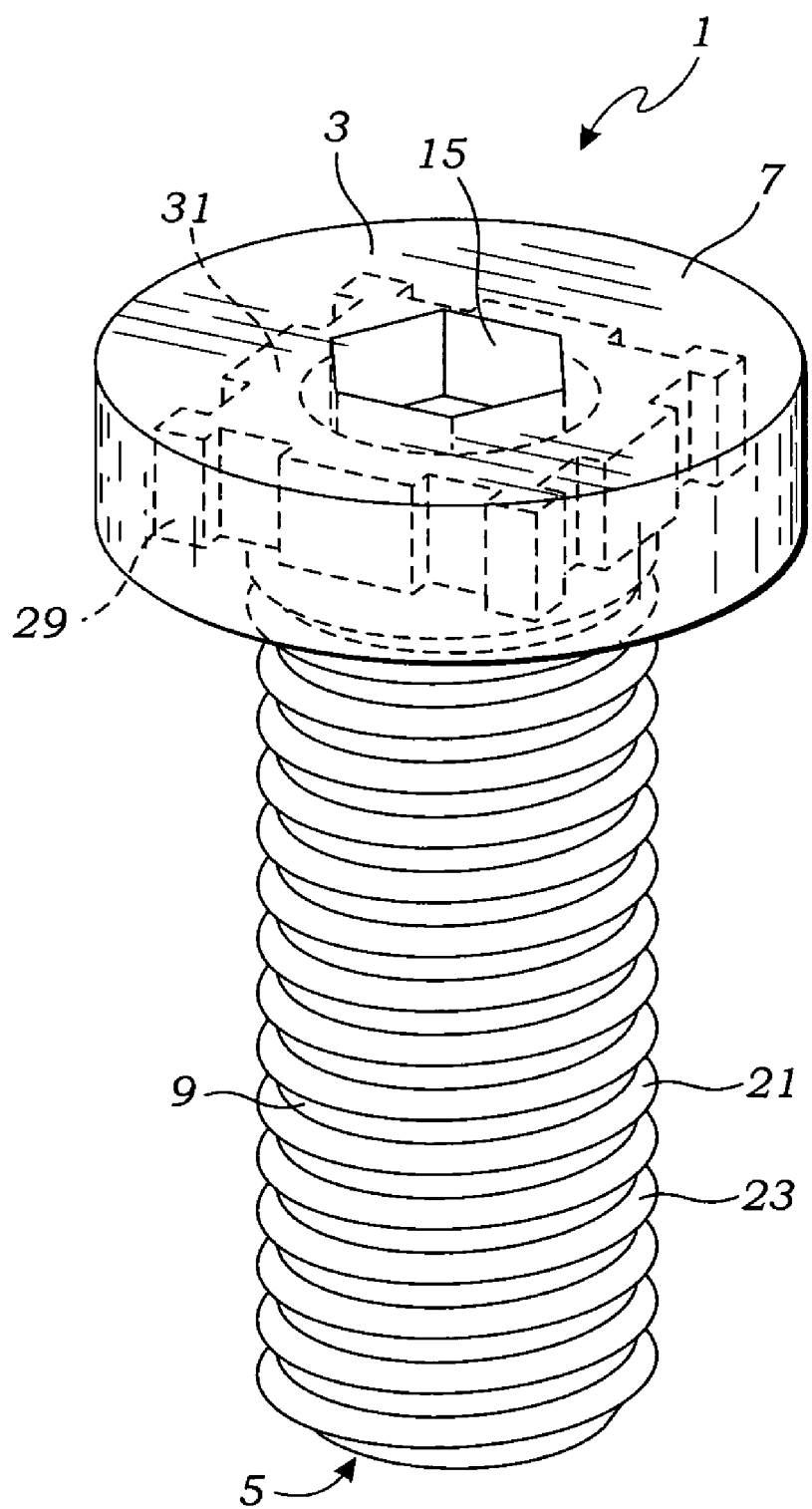
FIG. 8 is a perspective view of still an additional embodiment of the composite metal male fastener of the present invention with a round head with hexagonal recess and an interior notched square flange.

With reference to FIGS. 1-8, the composite metal male fastener has an exterior construction substantially identical to traditional male fasteners. The composite metal male fastener 1 includes a threaded shaft 9 and a head 7 for rotating the shaft. In addition, the fastener's head 7 defines the male fastener's proximal extremity 3 while the tip of the shaft 9 defines the metal fastener's distal extremity 5. The male fastener of the present invention may take any of numerous shapes of the multitude of shapes employed by existing male fasteners. For example, the male fastener may be of virtually any length or diameter. The male fastener head may take any of numerous shapes as can be selected by those skilled in the art. For example, the head may include a hexagonal shape as illustrated in FIG. 3. The head may include a round shape with hexagonal recess 15 as illustrated in FIG. 8. The male fastener head may include a knurled outer surface for rotation by a tool or fingers. Alternatively, the male fastener head may take one of many polygonal shapes 31 such as those illustrated in FIGS. 2, 3 and 8. In addition, the fastener threads may be selected by those skilled in the art so as to incorporate desired thread angles, depth and pitch.

Unlike traditional male fasteners, the composite metal male fastener 1 of the present invention is constructed of two materials. With reference primarily to FIG. 1, the male fastener 1 includes a shell 21 made of metal. The shell 21 includes a central bore 25 which extends axially along the axis defined by the proximal extremity and distal extremity of the male fastener 1. The bore extends from the proximal end of the shell to form an opening 27 toward the opposite end of the male fastener where the bore 25 is closed by the shell at the shell's distal extremity 5. Further, the shell 21 includes a radially projecting flange 29 at the shell's proximal extremity.

As also best illustrated in FIG. 1, the male fastener 1 of the present invention includes a core element 37 made of a composite material. The core element 37 fills the shell's central bore 25 which defines the central longitudinal axis of the male fastener 1. In addition, the core element extends through the opening 27 so as to encapsulate the shell's flange 29 to form a male fastener's head 7.

Figure 5:
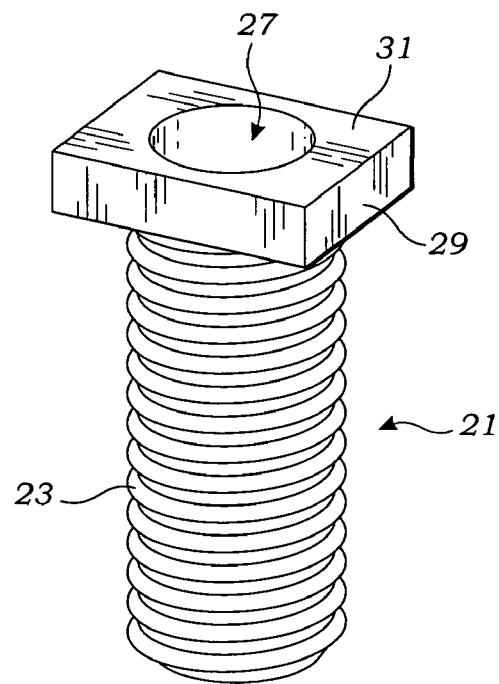
FIG. 5 is a perspective view of still an additional embodiment of an elongate hollow shell for use with the composite metal male fastener of the present invention.
Figure 6:
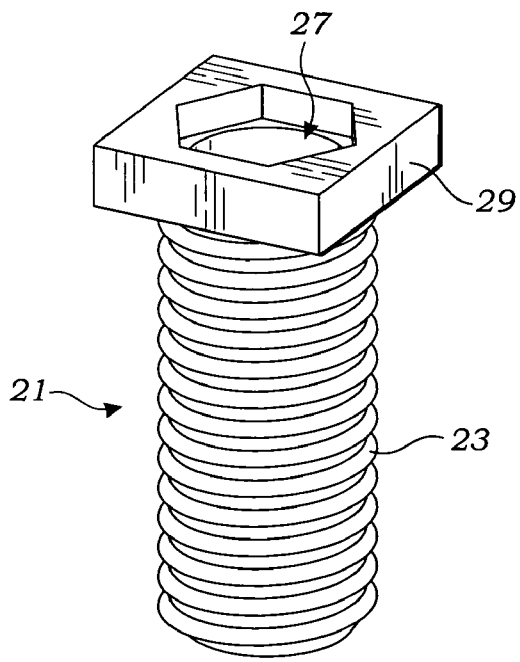
FIG. 6 is a perspective view of still an additional embodiment of an elongate hollow shell for use with the composite metal male fastener of the present invention.
Figure 7:
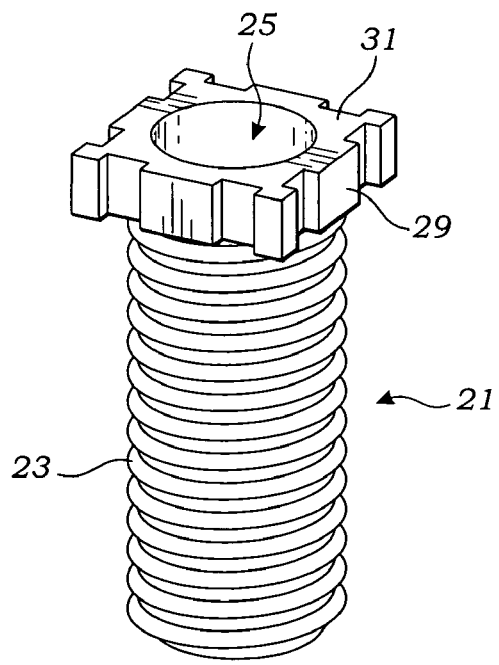
FIG. 7 is a perspective view of still an embodiment of an elongate hollow shell for use with the composite metal male fastener of the present invention.

As illustrated in FIGS. 2, 3 and 8, the head 7 may take any shape or form so as to assist the user in rotating the male fastener for insertion or retraction of the shell's male threads into the threads of a corresponding female fastener (not shown). As illustrated in the figures, the encapsulated flange 29 may also be constructed of various shapes such as having a knurled exterior as illustrated in FIG. 4, or having a four sided polygonal shape as illustrated in FIG. 5, or having a four sided notched shape shown in FIG. 7. However, it is preferred that the flange 29 not have a circular shape which would be prone to rotation within the core element's head. The flange's exterior shape may be the same as the exterior shape of the male fastener's head 7. For example, the male fastener having a hexagonal head with an interior hexagonal flange is considered a preferred embodiment. Alternatively, the head 7 may encapsulate a flange 29 of a different shape. For example, FIG. 3 illustrates a male fastener having a hexagonal head 7 but having a four-sided polygonal encapsulated flange. In still additional embodiments, FIG. 8 illustrates a male fastener 1 having a round head formed with a hexagonal recess 15 for receipt of an Allen wrench or the like which encapsulates a substantially square polygonal flange which is notched to further inhibit rotation of the flange within the core element's head.

The metal shell and composite core element may be constructed of various materials. The shell may be constructed of steel, aluminum, titanium or various alloys as can be selected by those skilled in the art. However, a lightweight high strength titanium is considered the preferred material for construction of the male fastener's shell 21. The core element may also be constructed of virtually any composite material such as ABS, nylon, graphite, fiberglass, polyvinyl chloride, etc. However, polyetheretherketone (PEEK) is considered a preferred material for construction of the core element.

The composite metal male fastener of the present invention may be formed by various metals and plastic fabrication methods known to those skilled in the art. For example, the shell may be stamped, forged or molded. However, preferably the shell is machined to provide a high quality finish. The introduction of the core element to the shell may also be fabricated employing various methods. However, it is preferred that the core element be molded within a mold where the shell has already been positioned in place and the composite material is introduced into the mold so as to fill the shell and encapsulate the shell's flange.

While several particular forms of the invention have been illustrated and described, it will be apparent that various modifications can be made without departing from the spirit and scope of the invention. Therefore, it is not intended that the invention be limited except by the following claims. Having described my invention in such terms so as to enable persons skilled in the art to understand the invention, recreate the invention and practice it, and having presently identified the presently preferred embodiments thereof, I claim:

We claim:

1. A composite-metal male fastener comprising:
    an elongate hollow shell made of metal, said shell element including a proximal extremity, a distal extremity and a longitudinally aligned central bore having a substantially circular cross-section, said proximal extremity including a radially extending flange having a top, one or more sides, a bottom and an opening extending into said bore, said distal extremity's exterior including male threads for threadably receiving the threads of a female fastener; and
    a core element made of a composite material, said core element filling said shell's central bore, said core element further extending proximally and radially from said bore to encapsulate said flange including covering said flange's top and one or more sides to form a male fastener head for rotation of the male fastener, and wherein said flange is not circular in order to inhibit rotation of said flange within said head.

2. The composite-metal male fastener of claim 1 wherein said core element encapsulates said flange includes covering said flange's bottom.

3. The composite-metal male fastener of claim 1 wherein said shell element is made of a titanium alloy and said core element is made of polyetheretherketone.

4. The composite-metal male fastener of claim 1 wherein said head is polygonal.

5. The composite-metal male fastener of claim 1 wherein said head is hexagonal.

6. The composite-metal male fastener of claim 1 wherein said flange is polygonal and said head is polygonal.

7. The composite-metal male fastener of claim 1 wherein said flange is polygonal and said head is polygonal but not the same polygonal shape as said flange.

\* \* \* \* \*